(12) United States Patent
Nagle

(10) Patent No.: US 7,280,545 B1
(45) Date of Patent: Oct. 9, 2007

(54) COMPLEX ADAPTIVE ROUTING SYSTEM AND METHOD FOR A NODAL COMMUNICATION NETWORK

(76) Inventor: Darragh J. Nagle, 3159 Plaza Blanca, Santa Fe, NM (US) 87507

( * ) Notice: Subject to any disclaimer, the term of this patent is extended or adjusted under 35 U.S.C. 154(b) by 893 days.

(21) Appl. No.: 10/022,283

(22) Filed: Dec. 20, 2001

(51) Int. Cl.
*H04L 12/28* (2006.01)
*G06F 15/173* (2006.01)

(52) U.S. Cl. .................. 370/400; 709/242; 709/243

(58) Field of Classification Search ............... 370/237, 370/255, 437, 471; 709/285, 246, 224
See application file for complete search history.

(56) References Cited

U.S. PATENT DOCUMENTS

| | | | |
|---|---|---|---|
| 4,494,192 A | 1/1985 | Lew et al. ................. 364/200 |
| 4,617,656 A | 10/1986 | Kobayashi et al. ........... 370/74 |
| 4,736,371 A | 4/1988 | Tejima et al. ................ 370/95 |
| 4,742,357 A | 5/1988 | Rackley ..................... 342/457 |
| 4,747,130 A | 5/1988 | Ho ............................. 379/269 |
| 4,910,521 A | 3/1990 | Mellon ....................... 342/45 |
| 5,034,961 A | 7/1991 | Adams ....................... 375/130 |
| 5,068,916 A | 11/1991 | Harrison et al. .............. 455/39 |
| 5,105,424 A * | 4/1992 | Flaig et al. .................. 709/243 |
| 5,231,634 A | 7/1993 | Giles et al. ................ 370/95.1 |
| 5,233,604 A * | 8/1993 | Ahmadi et al. ............. 370/238 |
| 5,241,542 A | 8/1993 | Natarajan et al. .......... 370/95.3 |
| 5,317,566 A | 5/1994 | Joshi ........................... 370/60 |
| 5,392,450 A | 2/1995 | Nossen ....................... 455/12.1 |
| 5,412,654 A * | 5/1995 | Perkins ....................... 370/312 |
| 5,424,747 A | 6/1995 | Chazelas ..................... 342/70 |
| 5,502,722 A | 3/1996 | Fulghum ................... 370/69.1 |
| 5,506,838 A * | 4/1996 | Flanagan ................... 370/258 |
| 5,517,491 A | 5/1996 | Nanni et al. ................. 370/29 |
| 5,555,425 A | 9/1996 | Zeller et al. ................ 395/800 |
| 5,555,540 A | 9/1996 | Radke ....................... 370/16.1 |
| 5,572,528 A | 11/1996 | Shuen ..................... 370/85.13 |

(Continued)

FOREIGN PATENT DOCUMENTS

CA 2132180 3/1996

(Continued)

OTHER PUBLICATIONS

Wong et al., "Soft Handoffs in CDMA Mobile Systems", Dec. 1997, IEEE Personal Communications.

(Continued)

*Primary Examiner*—Hassan Kizou
*Assistant Examiner*—Brian Roberts

(57) ABSTRACT

A complex adaptive routing system and method for routing data packets in a nodal network, in particular, an ad-hoc nodal network. Each data packet contains data representing its routing strategy for routing to a destination node. When a node receives the data packet, it executes an agent program to determine the best route for routing the data packet to its destination node based on the routing strategy and other factors, such as the current conditions of the nodes and paths to the nodes. The agent program updates the strategy data in the data packet, as well as the routing table of the node, before the node sends the data packet to the next node in the selected route. The system and method therefore enables the data packet routing decisions to be dynamically adapted to changing conditions in the network.

40 Claims, 4 Drawing Sheets

U.S. PATENT DOCUMENTS

| | | | |
|---|---|---|---|
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,721,819 A * | 2/1998 | Galles et al. | 709/243 |
| 5,745,483 A | 4/1998 | Nakagawa et al. | 370/335 |
| 5,774,876 A | 6/1998 | Wooley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,104,712 A | 8/2000 | Robert et al. | 370/389 |
| 6,108,710 A * | 8/2000 | Brabson et al. | 709/241 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,216,173 B1 * | 4/2001 | Jones et al. | 715/705 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,260,072 B1 * | 7/2001 | Rodriguez-Moral | 709/241 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,456,599 B1 * | 9/2002 | Elliott | 370/254 |
| 6,754,188 B1 * | 6/2004 | Garahi et al. | 370/328 |
| 6,791,949 B1 * | 9/2004 | Ryu et al. | 370/254 |
| 2001/0022780 A1 * | 9/2001 | Mizutani et al. | 370/261 |
| 2001/0053699 A1 | 12/2001 | McCrady et al. | 455/513 |
| 2002/0013856 A1 * | 1/2002 | Garcia-Luna-Aceves et al. | 709/238 |
| 2002/0036987 A1 * | 3/2002 | Garcia-Luna-Aceves et al. | 370/238 |
| 2002/0049561 A1 * | 4/2002 | Garcia-Luna-Aceves et al. | 702/182 |
| 2002/0062388 A1 * | 5/2002 | Ogier et al. | 709/238 |
| 2002/0176399 A1 * | 11/2002 | Wilmer | 370/349 |
| 2002/0191573 A1 * | 12/2002 | Whitehill et al. | 370/338 |
| 2003/0165117 A1 * | 9/2003 | Garcia-Luna-Aceves et al. | 370/238 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Sef-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

COMPLEX ADAPTIVE ROUTING SYSTEM AND METHOD FOR A NODAL COMMUNICATION NETWORK

FIELD OF THE INVENTION

The present invention relates to an improved routing system and method for routing data packets in a nodal network. More particularly, the present invention relates to an adaptive complex routing system and method that utilizes agents in both the packets of data and nodes in the network to adaptively determine the best paths from a source node to a destination node for the data packets. Overall control of the complex adaptive routing system is maintained by a program which establishes rules for the detection and acquisition of information and rules to determine the effects of the detected and acquired information.

DESCRIPTION OF THE RELATED ART

In recent years, a type of mobile communications network known as an "ad-hoc" network has been developed for use by the military. In this type of network, each user terminal (hereinafter "mobile node") is capable of operating as a base station or router for the other mobile nodes, thus eliminating the need for a fixed infrastructure of base stations. Accordingly, data packets being sent from a source mobile node to a destination mobile node are typically routed through a number of intermediate mobile nodes before reaching the destination mobile node. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in conventional ad-hoc networks, further enable the mobile nodes to access a fixed network and thus communicate with other types of user terminals, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", issued on Jul. 4 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct. 19, 2004, and in U.S. Pat. No. 6,873,839 entitled "Prioritized-Routing for an Ad-Hoc, Peer-to-Peer, Mobile Radio Access System", issued on Mar. 29, 2005, the entire content of each being incorporated herein by reference.

Traditional routing systems in some nodal networks use a designed infrastructure which provides efficient routes for data to flow from a source node to a destination node. FIG. 1 illustrates a conceptual block diagram of a nodal network 100 including nodes 102 (identified as nodes N1 through N13), wherein the nodes N1 through N13 are interconnected by links, for example, links 104A through 104U. A node can be, for example, a stationary or mobile radio, a wireless telephone, or any other suitable device having a transceiver. Likewise, a link can be any suitable wireless link, such as a radio frequency or microware communications link, or any suitable fixed communications link, such as a conductive or fiber optic cable or the like. Also, although only a finite number of nodes and links are represented, the network 100 can include any practical number of nodes, with each node having temporary or permanent links between itself and one or more neighboring nodes.

A packet of data traversing the nodal network 100 has both a source address and a destination address. The designed infrastructure associated with the network 100 chooses the most appropriate route and transports the packet from the source node to the destination node. An analogy of this type of routing system is a conventional package delivery service, such as the mail.

For example, assume that a packet of data P1 entering the network 100 at node N1 (or generated by node N1) is addressed to N12. The designed infrastructure of network 100 will provide direction from N1 to N12. For example, these direction could entail traveling from node N1 to node N2 along link 104A, from node N2 to node N4 along link 104D, from node N4 to node N3 along link 104F, and finally, from node N3 to node N12 along link 104G. Of course, the designed infrastructure alternatively could have directed packet P1 to travel from node N1 to node N12 via link 104B which would appear to be the most direct route. However, as discussed below, sometimes there are reasons why the seemingly most direct route is not necessarily the best route. That is, since a link is a connection between two adjacent nodes; its physical form will be determined by the network 100 of which it is part. For example, in a cellular network, the links could be landlines, wireless transmissions, satellite up and down links or fiber optic links, to name a few.

Networks that use a designed infrastructure typically employ algorithms that are used to determine the path of intermediate nodes via which the data packets are routed between source and destination nodes. The algorithms determine paths that are typically based on the shortest distance between the source and destination nodes or, assuming that the data packet transport medium is wireless, the least power required to perform the routing. However, such algorithms do not necessarily produce a predictable delivery of data packets. For example, routing of data packets can be delayed due to congestion in intermediate nodes. Also, delivery failure of data packets can occur on noisy radio links between nodes. Furthermore, certain nodes may become inaccessible, or certain links may have deteriorated due to factors such as interference, physical obstructions, and so on. Therefore, these routing systems may be less adaptable than desired to changes that might occur in the status of nodes or links between nodes.

Accordingly, a need exists for a nodal network that is capable of effectively and efficiently adapting to changing conditions of nodes and links in the network when making routing path selections for routing data packets from source nodes to destination nodes.

SUMMARY OF THE INVENTION

It is therefore an object of the invention to provide a nodal network that can, in real time, adapt to current conditions in acquiring and making path selections, when routing a path from a source to a destination.

Another object of the invention to provide a complex adaptive routing system and method for a nodal network that utilizes agents in both the packets of data and nodes in the network to adaptively determine the best paths from a source node to a destination node for the data packets.

These and other objects are substantially achieved by providing a complex adaptive routing system and method for routing data packets in a nodal network, in particular, an ad-hoc nodal network. Each routing data packet contains data representing its routing strategy for routing to a destination node. When a node receives the data packet, it executes an agent program to determine the best route for routing the data packet to its destination node based on the routing strategy and other factors, such as the current conditions of the nodes and paths to the nodes. The agent program updates the strategy data in the data packet, as well as the routing table of the node, before the node sends the data packet to the next node in the selected route. The system and method therefore enables the data packet routing decisions to be dynamically adapted to changing conditions in the network.

These and other objects are also substantially achieved by providing a system and method for routing a data packet in a network, such as an ad-hoc network comprising nodes interconnected by links. The system and method employs the operations of receiving a data packet at a receiving node, and extracting routing strategy data from the received data packet, the routing strategy data including information pertaining to at least one routing path via which to route the received data packet to a destination node, with each routing path including at least one other node. The system and method further perform the operations of selecting a selected routing path via which to route the data packet based on the routing strategy data, and updating the routing strategy data in the data packet. The selected routing path can be one of the routing paths identified by the routing strategy, or a different routing path deemed most suitable for routing based on the routing strategy. Also, the routing strategy data also can include information representing at least some of the nodes that the data packet visited prior to being received by the receiving node. The system and method further include the operations of transmitting the data packet to a node along the selected routing path, updating a routing table at the receiving node based on the updated routing strategy data, and sending the updated routing strategy data to other nodes. In addition, the system and method can combine data representing at least two routing paths to generate data representing a different routing path, to thus reproduce the routing strategy data with some mutation.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
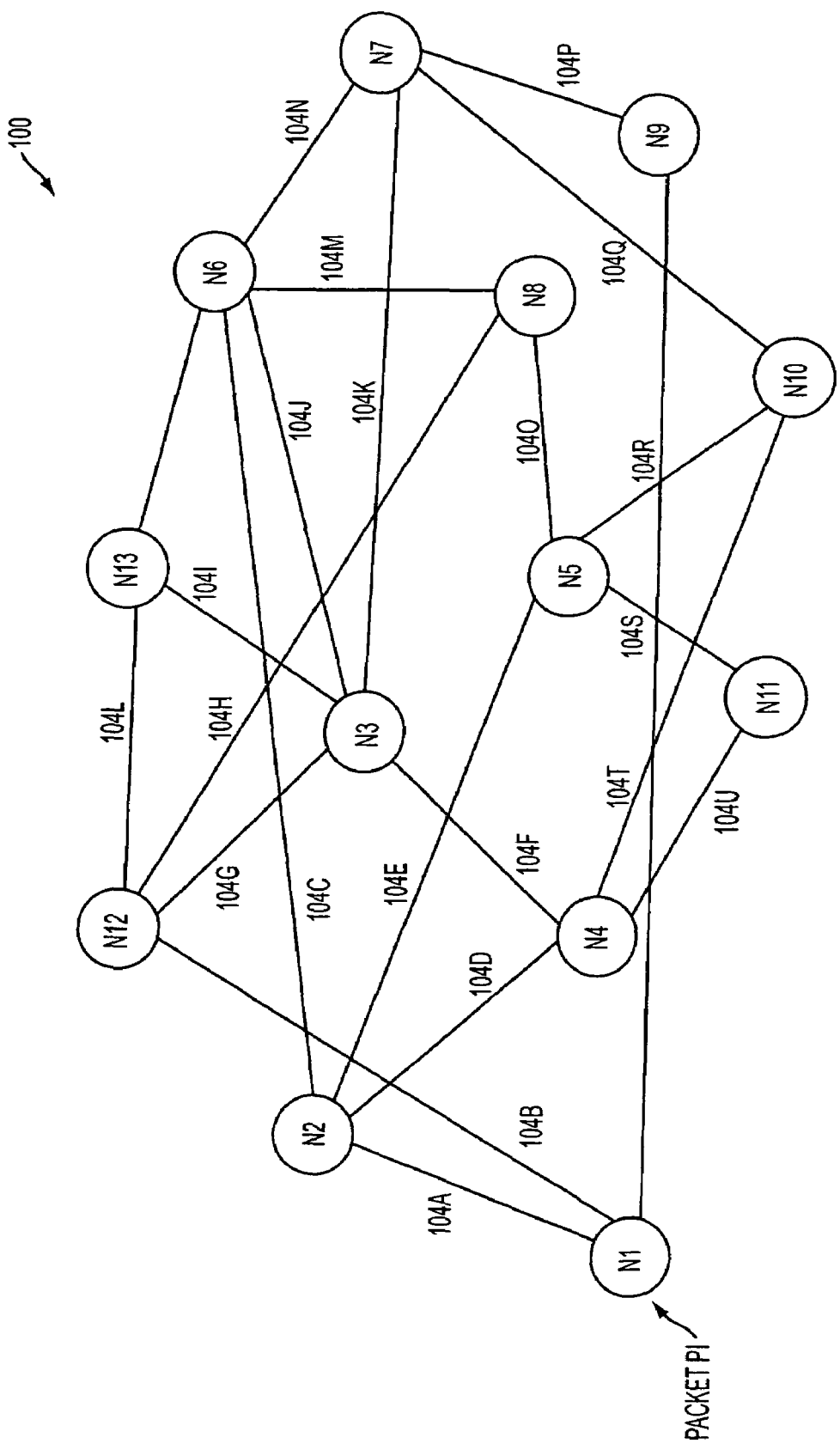
FIG. 1 illustrates a conceptual block diagram of a nodal network having a plurality of nodes and links between the nodes.
Figure 2:
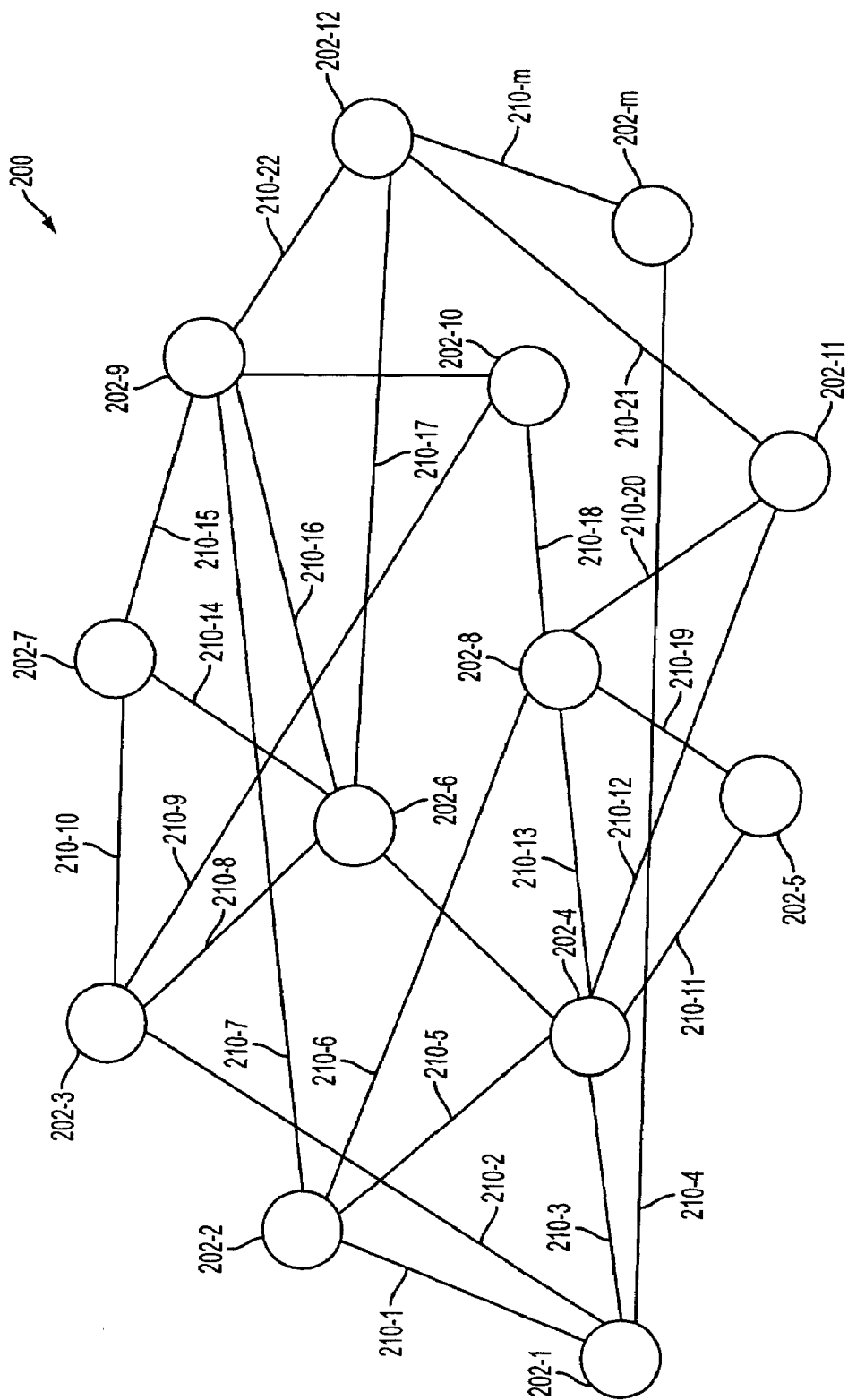
FIG. 2 illustrates a conceptual block diagram of a nodal network employing an adaptive complex routing system and method according to an embodiment of the present invention.

A nodal network 200 employing a complex adaptive routing system and method according to an embodiment of the present invention is shown in FIG. 2. As indicated, the network 200 is preferably an ad-hoc network as discussed in the Background section above, and includes a plurality of nodes 202-1 through 202-n (referred to generally as node or nodes 202). A node 202 can be, for example, a fixed or mobile wireless radio, or any other type of device having a transceiver that is capable of transmitting and receiving data packets.

Figure 3:
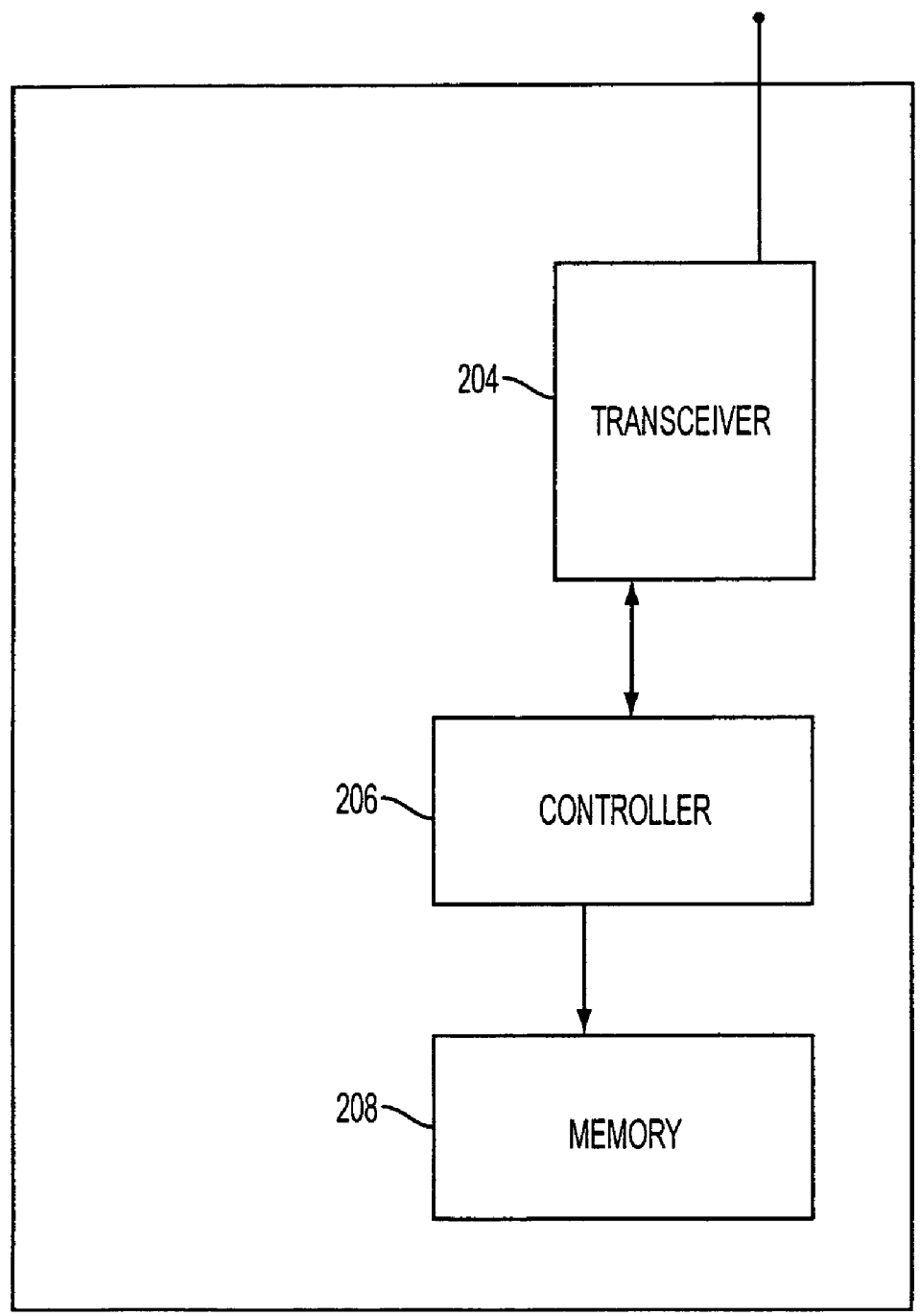
FIG. 3 is a block diagram illustrating features of a node employed in the network shown in FIG. 2.

For example, as shown in FIG. 3, each node 202 includes a transceiver 204 including a transmitter and a receiver which is capable of respectively transmitting and receiving signals, such as packetized data signals, under the control of a controller 206. The packetized data signals can include, for example, voice, data or multimedia. Each node 202 further includes a memory 208, which can include a random access memory (ROM) for storing information pertaining to the operation of the node 202, and a random access memory (RAM) for storing information such as routing table information and the like in accordance with which data packets are transmitted, received and routed by the transceiver 204 as described in more detail below. A node 202 can also function as an intelligent access point (IAP) which can provide access to other networks, such as other ad-hoc networks, the PSTN, the Internet, and so on, or simply as a router for routing data packets to other nodes.

As shown in FIG. 2, the nodes 202 therefore are capable of establishing communication links 210 with each other, which can be, for example, wireless radio frequency (RF) communications linked, fixed terrestrial links such as cable or optical fiber links, and so on. Also, as can be appreciated by one skilled, in the art, because the network 200 can be an ad-hoc network, the status of the links 210 between the nodes 202, as well as the status of the nodes 202 themselves, can change on a dynamic basis. Accordingly, although links 210-1 through 210-n are shown for exemplary purposes in FIG. 2, these can change in status, and more or fewer links may be present in the network 200 at any given time.

An example of a complex adaptive routing system and method according to an embodiment of the present invention that can be employed in the network 200 will now be described. Specifically, the system is formed by a large number of individual agents with unique strategies, which operate as a group in a physical environment, and pass forward successful strategies by direct communication and by reproduction of the most successful agents with trait recombinations and a very small percentage of mutations. Some concepts of complex adaptive routing systems are described in a book by John Holland entitled "Hidden Order"; Addison Wesley, 1995 and, in particular, in the chapter entitled "How Adaptation Builds Complexity". The entire content of the book is herein incorporated by reference.

A general analogy of a complex adaptive routing system is a bee hive. That is, many individual bees follow strategies which serve the entire colony, and which also serve the individual bee. Successful strategies are communicated to other bees. The entire colony thus has an emergent behavior which is different from the behavior of the individuals bees. Successes are rewarded, and new strategies are discovered and tested.

By way of another real world comparison, when driving in a car, if a driver hears on the radio that the freeway is jammed, the driver selects an alternate route. This behavior in a complex adaptive system allows for optimization. Packets inbound to the wired world could route themselves over parallel routes, distributing themselves according to link congestion, thereby effectively increasing the bandwidth of the network.

The type of agents that can be employed by the complex routing system according to an embodiment of the present invention can generally be classified into two types, namely, data packets and nodes 202 of the type described above. The primary agents are the data packets, which interact with the routing information at the nodes 202 to determine the next hop of their choice based on their strategy. A data packet contains data representing the nodes 202 that it has passed through, which is referred to as node history. A data packet also includes data representing its strategy or strategies, which may include the desired route that it is to traverse when traveling to its destination node 202. The data packet uses this information while employing its strategy and discovering new strategies.

Strategies are typically associated with a goal or goals that the data packet is to achieve from a routing standpoint. For example, to traverse from point A to point B, for example, from node 202-1 to node 202-8, the best strategy contains the best route to point B from point A. However, to traverse back from point B to point A, the goal is different, and thus, the strategy is different. The knowledge of the best strategy from point A to point B can be used in the discovery of the best strategy from point B to point A. However the strategy of using the reverse of the best route from point A to point B is not necessarily always the best strategy.

For example, if there is an fiber link available from point B to point A, but only in that direction, and at a much higher speed than the Ethernet link from point A to point B, then the discovery of the fiber link route will outperform a competing strategy of the reverse Ethernet route from point B to point A, and will be assigned credit for the better strategy as discussed in more detail below. This credit will allow the most fit strategy to reproduce during rule discovery.

An example of a rule discovery sequence will now be demonstrated with reference to a group of existing rules as follows:

Rule A: "Dest: 292 Strategy: C F G *"
Rule B: "Dest: 292 Strategy: D H G *"
Rule C: "Dest: 284 Path: 204,207,211,220,218,284"
Rule D: "Dest: 284 Path: 208,211,224,232,284"
Rule F: "Dest: 278 Path: 284,274,275,268,278"
Rule G: "Dest: 292 Path: 278,284,286,292"
Rule H: "Dest: 278 Path: 284,268,278"

Since Rules F and H are both routes from a node numbered "284" to a node numbered "278" using intermediate nodes (e.g., "274", "268", etc.), they are both building blocks for that route and are interchangeable. Since Rule H provide a shorter route, where there are equally performing links, it will be faster. The new rule discovery will recombine A (C F G) and B (D H G) and produce new rule N (C H G). In this case, the discovery is more efficient than previously known rules. This rule has a high probability of success. In the case of a less efficient rule, subsequent trials will not produce good results, and the rule will be abandoned.

This allows real-time feedback from the physical environment to be considered in the dynamic discovery of new and more efficient strategies. For example, node 202 can store information in its memory 208 about data packets that have traversed the node 202, the strategies they used, and the destinations they have selected. For example, if 99% of the data packets received during the last minute by node 202-1 selected the next hop to node 202-8 to be through node 202-4 via link 210-3 (route A), and 1% chose the next hop to node 202-8 to be through node 202-2 via link 210-1 (route B), then the packet received by node 202-1 can choose routes A or B as locally discovered routes, and can qualify the choice based on factors such as link reliability, speed, or popularity. This technique is an example of dynamic discovery. In this case, the data packet may chose route A since it is presumably the preferred route. However, by taking into account other factors, the data packet may chose route B.

For example, when a data packet arrives at a node 202, the controller 206 of the node 202 (see FIG. 3) extracts the data packet's node history and strategy and provides this information to an agent program that the controller 206 is executing. The agent program also considers the latest routing information in the routing table that is stored in the memory 208 of the node 202. In addition, information included in the data packet as acted on by the agent program can be used to update the routing table information stored in the memory 208 of the node 202. A node 202 can also update its routing table information by receiving specific routing table broadcasts from its neighboring nodes.

A strategy can be represented by a simple character string, and an agent program contains functions referred to as detectors and effectors which interact with the strategies in the data packet. The detectors retrieve data from the data packet representing, for example, the data packet's node history and strategy, and control the storing and collating of the data. This is done for all packets that are received by the particular node 202. Effectors, on the other hand, interpret the data collected by detectors and creates a new best routing path, for example, a new strategy, for the data packet. The output of the effectors thus can be considered by the controller 206 to thus determine the manner in which the data packet is to be routed.

An example of a very simple strategy is a strategy containing only a destination address "x.x.x.x". This strategy is interpreted by the effector as "please send me to address x.x.x.x", without any concern for paths. A more advanced strategy might be represented by "DestHost A, B, C; D; *", which is interpreted by the effector as "my destination is DestHost, and I would like to be routed to DestHost via known paths A, B, or C, or if those fail use known route D, and if that fails, use locally discovered paths."

For example, assuming that the packet has been received at node 202-1 and the "DestHost" is node 202-8, path "A" could comprise links 210-1 and 210-6, path "B" could comprise links 210-1, 210-5 and 210-13, and path "C" could comprise links 210-3 and 210-13. In accordance with this strategy, the agent program will chose one of these paths if it is available. However, assuming that one or more of the links in each of these paths have become obstructed or undesirable (e.g., due to noise or interference), then the agent program will chose route "D" which could, for example, comprise links 210-3, 210-11 and 210-19. In the event that the less preferred route "D" is unavailable, the agent program will attempt other locally discovered paths to route the data packet to node 202-8.

An alternative strategy might try the locally discovered paths first, which may be a risky but possibly rewarding behavior. Also, an explicit strategy can carry an advertisement of a known path with a unique identifier to the nodes: "Path P321 To DestHost 144 153 12 72 DestHost". This explicit strategy becomes known as the symbolic strategy "P321" and facilitates the exchange of knowledge in the development of new strategies.

Figure 4:
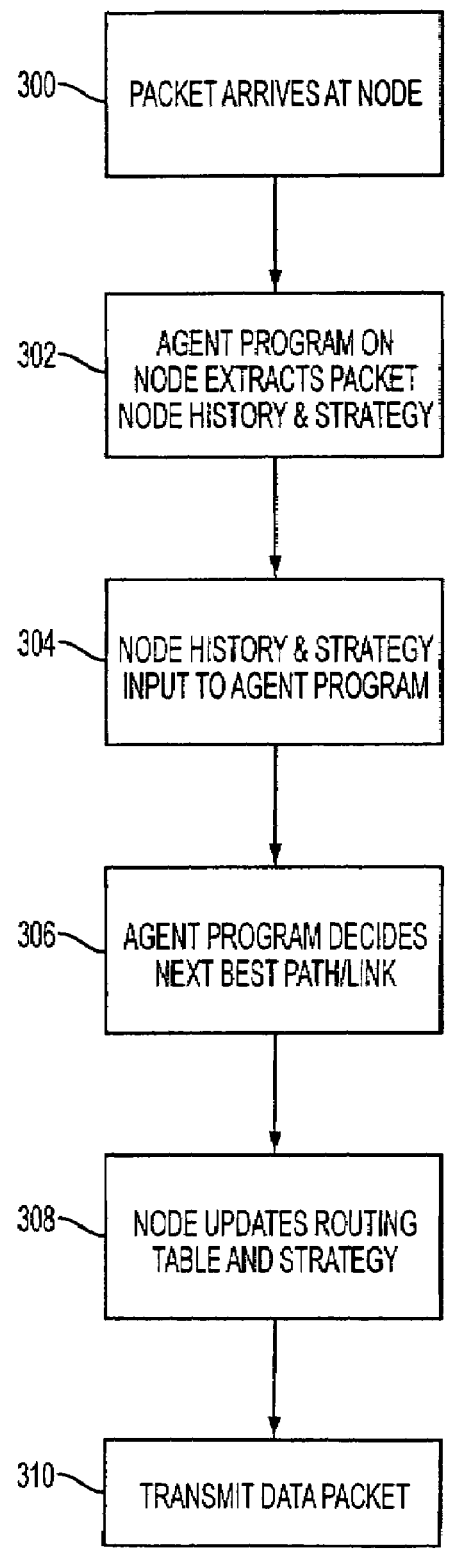
FIG. 4 is a flowchart illustrating exemplary operations performed by the network shown in FIG. 2 for routing a data packet to a destination node according to an embodiment of the present invention.

FIG. 4 illustrates a flowchart of exemplary operations performed by a network 200 employing a complex adaptive routing system and method according to an embodiment of the invention as discussed above. In step 300, a data packet arrives at a node 202. The data packet is a data packet agent and contains a node history and strategy. In step 302, the detector of agent program being executed by the controller 206 of node 202 extracts the node history and strategy from the data packet. In step 304, the agent program obtains the node history from, for example, the memory 208 of the node 202. This information, along with the information extracted from the data packet, is considered by the effector of the agent program. Using the information obtained by detector, as well as the routing table information, data packet traffic, and so on as discussed above, the effector determines in step 306 which path should best be selected to best send the data packet to its destination.

In step 308, the agent program can then update the strategy of the data packet, as well as the node's routing table information in the node's memory 208. In step 310, the controller 206 controls the transceiver 204 of the node 202 to transmit the data packet to the appropriate next node 202 in the routing path according to the interpretation by the effector of the agent program. This process then repeats itself over and over, at each node 202, as first packet 102 winds it way through the network 100 to its ultimate destination.

As discussed above, successful strategies are rated on their performance. For example, strategies with the fewest number of hops to a destination can be rewarded. The most successful strategies are allowed to reproduce, and the least successful strategies age and die, and are replaced by newly formed strategies. All of these operations can be accomplished by the agent programs at the nodes 202. Accordingly, the agent program is therefore able to determine the most suitable node 202 to which to transmit the data packet according to the information in the data packet and the routing table information as considered by the agent program. As mentioned above, the agent program being executed by the controller 206 of a node 202 can cause the controller 206 to control the node's transceiver 204 to transmit newly discovered routes to the neighboring nodes 202.

Additional strategy behaviors include alternate strategy selection, and complex route loop detection. The former would be invoked if a network node fails, or moves. Adaptive agents, such as the nodes 202, can select alternate strategies and routes to heal the network. The latter is a simple strategy to implement by searching the packet travel memory for duplicate nodes.

It is also noted that the agent program can assign the strategies credit (fitness) based on their performance, and can select certain strategies for reproduction based on fitness. Reproduction can introduce a random crossover and exchange of "genetic" strategy (the symbols which represent strategies), thus producing new strategies in the offspring. For example, a successful strategy "Dest1 A B C D", when mated with the strategy "Dest1 E F G H", could produce the new strategy "Dest1 A B G H". Genetic crossover can occur randomly, or using qualifications. A random crossover algorithm for equal length parents is, for example, a crossover of the parent strands at one random location in the string, for the remainder of the string. This produces two child strands, each with strategy information inherited from both parents. Because the child strands are different from the parents, this is a discovery process. The success of the child strategies will be determined by subsequent testing in the environment.

In the case of qualification, parents can be selected based on known desired traits. For example, parents may be selected based on a common building block that meets system goals, such as in the above example of rule discovery, where the final destination of 292 was a goal used in the selection of the appropriate building blocks. In this case, only parents and building blocks that provided a path to get to node 292 could be selected.

In either case, subsequent testing of the new rule will determine its value and its survival. This is an important point, because it transforms a simple random selection or qualified selection algorithm into a genetic rule discover, test, and reward algorithm. Also, a small amount of mutation is introduced by the adaptive agent program, which prevents stagnation or locking.

Mutation is the introduction of a random element (atomic or symbolic) at a very low rate, for example, 0.0001 percent, which prevents lockout. Lockout occurs when successful strategies are undiscovered due to a feedback loop of success with existing strategies. In that case, the system is so focused on the success of known routes that it does not bother to look for other routes. Mutation corrects this, and keeps the doorway open to all new environmental information, most of which is useless, but a small portion of which is extremely valuable. An individual node does not have the time to evaluate all of this information, but the complex system, the general population of nodes and packets over time, does.

The new strategies just created join the general population, and as older and less fit strategies die, the new strategies replace them, and the cycle continues. Also, the adaptive agent program can change the reward structure to favor certain strategies, and then those strategies quickly emerge in the majority of the population. When opposite strategies are rewarded, they propagate similarly. The system adapts to environmental conditions under the control of the adaptive agents.

This system could be modified or extended through the introduction of new inputs from the network 200 and the outside environment, and new input and output actions provided in the form of a new detectors and effectors, with corresponding strategy symbols to be generated by a detector and acted upon by an effector. New inputs, strategy symbols, detectors, and effectors allow the emergent strategies to address all inputs with new behaviors in the newly provided effectors, creating new actions by the system.

For example, as discussed above, rule discovery generates new symbols by aggregating successful groups of specific nodes in a route into new optimized symbols. For example, the rule discovery could use a group of specific nodes representing a path from node "1" to destination node "292" (Dest: 292 History: 1,5,7,1,5,7,8,9,8,292) into new optimized symbols (NewRule N: Dest: 292 Path: 1,5,7,8,292). Detectors can then query the node's routing information for the path N's availability from this node. This translates to the question, "is the current node number in the path described by rule N?" The rule N is offered to the node, which will want to keep it if the node is contained in rule N, as future packets may benefit from the routing information in rule N. If however, rule N goes unused for a long time, it may be discarded.

In addition, new strategies can also be generated. For example, if a portion of the network (nodes 250 through 260) becomes congested during working hours, then strategy A (Dest 270: path 240,250,245,260,270) becomes temporarily unavailable. A node neighboring the congested node (e.g., the node numbered "245"), will drop the success score of path A based on failures, and an alternative strategy B (Dest: 270: path 240,244,247,266,267,268,270) becomes successful in spite of its length, due to the congestive failures in path A which are avoided by B. Child paths of A and B which traverse the congestion will fail during congestion, and succeed during other hours, so they are partially successful. Child paths of A and B which avoid the congestion are completely successful, and may begin to compete in path length efficiency, perhaps surpassing strategies that use the periodically congested nodes.

The resulting strategies are conditioned and tested for the alternative environments, along the entire path of the strategy. All that a strategy needs to do is list the desired paths for the detector (A, B, *). When A has become congested, any neighboring node becomes aware of the condition, so the packet agent detector does not see A at node "245" because it has had multiple failures. When the next strategy is evaluated by the detector, the node replies in the affirmative that B is visible and available. When the packet agent, working with the node agent, selects the path B, it inherits the experience of many previous generations of packets that have traversed around the congestion and, following the B strategy, it will not even attempt to re-enter the congestion zone, although nodes along that path will have the congestion zone visible as neighbors. The B strategy will thus become the primary strategy until it either is replaced by another strategy (e.g., strategy A) because the congestion has dissipated and its scores increased, or a random mutation has occurred to promote a periodic test to determine if the congested area is still congested.

Accordingly, as can be appreciated from the above, the technique generates a strategy that circumnavigates a known region of periodic congestion, and provides a manner to test for existence of congestion in the region. The technique also provides a route around the congestion, as well as the ability to restore use of the region when it is no longer congested, and the ability to continue to monitor all of the extremities of a periodically congested region for changes, such as improvements or degradations in the area.

Furthermore, to preserve bandwidth in a bandwidth limited network, a small percentage of data packets may be used as packet agents. For example, a specific type of data packet can be used, such as an advertisement packet. Alternatively, a threshold can be set by the controller 206 of a node to cause the node 202 to generate and transmit a packet agent after a specified time interval has elapsed or a specified number of data packets have been transmitted.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for routing a data packet in a network comprising nodes interconnected by links, the method comprising at a routing node:
   receiving said data packet;
   extracting routing strategy data from said received data packet, said routing strategy data including information pertaining to at least one routing path via which to route said received data packet to a destination node, each said routing path including at least one other of said nodes;
   comparing said routing strategy data with one or more routing information including one or more alternative routing strategies stored within said routing node;
   selecting a routing path via which to route said data packet based on said comparing of said routing strategy data;
   assigning credits to the routing strategy data and the one or more alternative routing strategies;
   selecting a revised routing strategy by comparing the assigned credits when the selected routing path differs from the routing strategy data; and
   updating said routing strategy data in said data packet.

2. A method as clamed in claim 1, wherein:
   said routing strategy data includes information representing at least some of said nodes that said data packet visited prior to being received by said node.

3. A method as claimed in claim 1, further comprising:
   transmitting said data packet to a node along said selected routing path.

4. A method as claimed in claim 1, further comprising:
   updating a routing table at said routing node based on said updated routing strategy data.

5. A method as claimed in claim 1, wherein:
   said selecting selects as said selected routing path one of said at least one routing path identified by said routing strategy data.

6. A method as claimed in claim 1, wherein:
   said selecting selects as said selected routing path a routing path different than any said at least one routing path identified by said routing strategy data.

7. A method as claimed in claim 1, wherein:
   said updating includes combining data representing at least two routing paths to generate data representing a different routing path.

8. A method as claimed in claim 1, further comprising:
   sending said updated routing strategy data to other said nodes.

9. A method as claimed in claim 1, wherein:
   said updating includes generating a new routing strategy.

10. A method as claimed in claim 1, wherein:
    said network comprises an ad-hoc network.

11. A node for routing a data packet in a network comprising nodes interconnected by links, the node comprising:
    a receiver, for receiving said data packet; and
    a controller, for extracting routing strategy data from said received data packet, said routing strategy data including information pertaining to at least one routing path via which to route said received data packet to a destination node, each said routing path including at least one other of said nodes, for comparing said routing strategy data with one or more routing information including one or more alternative routing strategies stored within said routing node, for selecting a routing path via which to route said data packet based on said comparing of said routing strategy data, for assigning credits to the routing strategy data and the one or more alternative routing strategies, and selecting a revised routing strategy by comparing the assigned credits when the selected routing path differs from the routing strategy data, and for updating said routing strategy data in said data packet.

12. A node as clamed in claim 11, wherein:
    said routing strategy data includes information representing at least some of said nodes that said data packet visited prior to being received by said node.

13. A node as claimed in claim 11, further comprising:
    a transmitter, for transmitting said data packet to a next node along said selected routing path.

14. A node as claimed in claim 11, further comprising:
    a routing table stored within a memory,
    wherein said controller is further for updating said routing table based on said updated routing strategy data.

15. A node as claimed in claim 11, wherein:
said controller selects as said selected routing path one of said at least one routing path identified by said routing strategy data.

16. A node as claimed in claim 11, wherein:
said controller selects as said selected routing path a routing path different than any said at least one routing path identified by said routing strategy data.

17. A node as claimed in claim 11, wherein:
said controller performs said updating by combining data representing at least two routing paths to generate data representing a different routing path.

18. A node as claimed in claim 11, further comprising:
a transmitter for sending said updated routing strategy data to other said nodes.

19. A node as claimed in claim 11, wherein:
said controller performs said updating by generating a new routing strategy.

20. A node as claimed in claim 11, wherein:
said network comprises an ad-hoc network.

21. A method for routing a data packet within an adhoc network comprising
generating a data packet at an originator node, the data packet comprising:
a node history,
a routing strategy, and
a destination node field;
receiving the data packet by a routing node;
when the routing node is not the destination node, at the routing node:
identifying a best routing strategy by comparing the routing strategy to one or more route information stored in the routing node,
assigning credits to each of the routing strategy and the one or more alternative routing strategies and selecting a revised data packet route by comparing the assigned credits,
generating the revised data packet route including a revised routing strategy when the best routing strategy differs from the routing strategy, and
transmitting the data packet to a next routing node along a data packet route associated with the best routing strategy; and
repeating the receiving, identifying, generating, and transmitting steps at the next routing node.

22. A method for routing a data packet within an adhoc network as claimed in claim 21, further comprising, prior to the generating step, storing the one or more route information in a routing table in a memory of the routing node.

23. A method for routing a data packet within an adhoc network as claimed in claim 22, wherein the one or more route information comprises one or more information about at least one other data packet that had previously traversed the routing node selected from a group comprising a routing strategy and a selected destination node.

24. A method for routing a data packet within an adhoc network as claimed in claim 22, further comprising prior to the repeating step:
updating the routing table at the routing node using the node history, the routing strategy, and the destination node of the data packet, and
wherein the repeating step includes repeating the updating step.

25. A method for routing a data packet within an adhoc network as claimed in claim 22, further comprising prior to the repeating step:
updating the routing table at the routing node using the revised routing strategy and the destination node of the data packet, and
wherein the repeating step includes repeating the updating step.

26. A method for routing a data packet within an adhoc network as claimed in claim 22, further comprising at the routing node prior to the receiving step:
receiving a routing table broadcast from a neighbor node; and
updating the routing table using the routing table broadcast.

27. A method for routing a data packet within an adhoc network as claimed in claim 21, wherein the node history comprises one or more data representing one or more nodes through which the data packet has previously passed through.

28. A method for routing a data packet within an adhoc network as claimed in claim 21, wherein the routing strategy comprises a desired route which the data packet is to traverse when traveling to the destination node.

29. A method for routing a data packet within an adhoc network as claimed in claim 21, wherein the routing strategy is associated with one or more routing goals for the data packet.

30. A method for routing a data packet within an adhoc network as claimed in claim 29, wherein the one or more routing goals can are selected from a group of routing goals comprising a route speed, a route performance, a route length, and a route probability of success.

31. A method of operation of a node within an adhoc network comprising:
receiving a data packet, the data packet comprising:
a node history,
a routing strategy, and
a destination node field;
comparing the node to the destination node;
when the node is not the destination node,
identifying a best routing strategy by comparing the routing strategy to one or more route information stored in the node,
assigning credits to each of the routing strategy and the one or more alternative routing strategies and selecting a revised data packet route by comparing the assigned credits,
generating the revised data packet route including a revised routing strategy when the best routing strategy differs from the routing strategy, and
transmitting the data packet to a next node along a data packet route associated with the best routing strategy.

32. A method of operation of a node within an adhoc network as claimed in claim 31, further comprising, prior to the receiving step,
storing the one or more route information in a routing table in a memory of the node.

33. A method of operation of a node within an adhoc network as claimed in claim 32, wherein the one or more route information comprises one or more information about at least one other data packet that had previously traversed the node selected from a group comprising a routing strategy and a selected destination node.

34. A method of operation of a node within an adhoc network as claimed in claim 32, further comprising:
updating the routing table using the node history, the routing strategy, and the destination node of the data packet.

35. A method of operation of a node within an adhoc network as claimed in claim 32, further comprising:
 updating the routing table using the revised routing strategy and the destination node of the data packet.

36. A method of operation of a node within an adhoc network as claimed in claim 32, further comprising:
 receiving a routing table broadcast from a neighbor node; and
 updating the routing table using the routing table broadcast.

37. A method of operation of a node within an adhoc network as claimed in claim 31, wherein the node history comprises one or more data representing one or more nodes through which the data packet has previously passed through.

38. A method of operation of a node within an adhoc network as claimed in claim 31, wherein the routing strategy comprises a desired route which the data packet is to traverse when traveling to the destination node.

39. A method of operation of a node within an adhoc network as claimed in claim 31, wherein the routing strategy is associated with one or more routing goals for the data packet.

40. A method of operation of a node within an adhoc network as claimed in claim 31, wherein the one or more routing goals can are selected from a group of routing goals comprising a route speed, a route performance, a route length, and a route probability of success.

* * * * *